(12) United States Patent
Trevisan et al.

(10) Patent No.: US 9,399,266 B2
(45) Date of Patent: Jul. 26, 2016

(54) OPERATING MACHINE AND RELATIVE METHOD FOR THE SURFACE TREATMENT OF CYLINDERS

(71) Applicant: TENOVA S.p.A., Milan (IT)

(72) Inventors: Claudio Trevisan, Cardano al Campo-Varese (IT); Paolo Gaboardi, Fino Mornasco-Como (IT); Giovanni Boselli, Magenta-Milano (IT)

(73) Assignee: TENOVA S.P.A., Milan (IT)

( * ) Notice: Subject to any disclaimer, the term of this patent is extended or adjusted under 35 U.S.C. 154(b) by 0 days.

(21) Appl. No.: 13/882,694

(22) PCT Filed: Dec. 5, 2012

(86) PCT No.: PCT/EP2012/005015
§ 371 (c)(1),
(2) Date: Apr. 30, 2013

(87) PCT Pub. No.: WO2013/091780
PCT Pub. Date: Jun. 27, 2013

(65) Prior Publication Data
US 2014/0332509 A1    Nov. 13, 2014

(30) Foreign Application Priority Data
Dec. 21, 2011   (IT) .............................. MI2011A2330

(51) Int. Cl.
*B23K 26/00*    (2014.01)
*B23K 26/08*    (2014.01)
*B23K 26/36*    (2014.01)

(52) U.S. Cl.
CPC ......... *B23K 26/0078* (2013.01); *B23K 26/0084* (2013.01); *B23K 26/0823* (2013.01); *B23K 26/0876* (2013.01); *B23K 26/362* (2013.01)

(58) Field of Classification Search
CPC ........... B23K 26/0078; B23K 26/0084; B23K 26/0823; B23K 26/0876; B23K 26/365; B23K 26/0064; B23K 26/0622; B23K 26/0626; B23K 26/0072; B23K 26/0075
USPC ............ 219/121.68, 121.69, 121.76, 121.77, 219/121.79, 121.82, 121.73
See application file for complete search history.

(56) References Cited

U.S. PATENT DOCUMENTS 4,535,218 A * 8/1985 Krause ................. B23K 26/073
                                                     148/111
4,806,731 A    2/1989 Bragard et al.
(Continued)

FOREIGN PATENT DOCUMENTS

| DE | 102005009696 | * | 6/2006 |
| EP | 0280671 |    | 8/1988 |
| EP | 1475053 |    | 11/2004 |

*Primary Examiner* — Dana Ross
*Assistant Examiner* — Joseph Iskra
(74) *Attorney, Agent, or Firm* — Themis Law

(57) ABSTRACT

A machine for the surface treatment of a cylinder includes a first operative station for supporting the cylinder and for bringing it into rotation around its longitudinal axis, and at least a second operative station cooperating with the first station for generating and emitting, by means of an optical fiber apparatus, pulsed laser radiations randomly striking the surface of the cylinder and defining a desired roughness on the same surface; the second station being adjustably coupled with the first station in a first direction parallel with respect to the axis of the cylinder and carrying one or more pulsed laser radiation emitting heads, and slidingly assembled with respect to the cylinder in a second direction perpendicular to the axis of the cylinder.

8 Claims, 7 Drawing Sheets

(56) References Cited

U.S. PATENT DOCUMENTS

| | | | | |
|---|---|---|---|---|
| 4,847,112 A | * | 7/1989 | Halleux | 427/556 |
| 4,947,023 A | * | 8/1990 | Minamida | B23K 26/0084 |
| | | | | 219/121.61 |
| 4,959,275 A | * | 9/1990 | Iguchi | B21B 27/005 |
| | | | | 101/32 |
| 5,575,931 A | * | 11/1996 | Stefani | B41C 1/05 |
| | | | | 219/121.68 |
| 8,454,105 B2 | * | 6/2013 | Smelser | B23K 26/0084 |
| | | | | 347/2 |
| 2006/0186100 A1 | * | 8/2006 | Philipp | 219/121.76 |

* cited by examiner

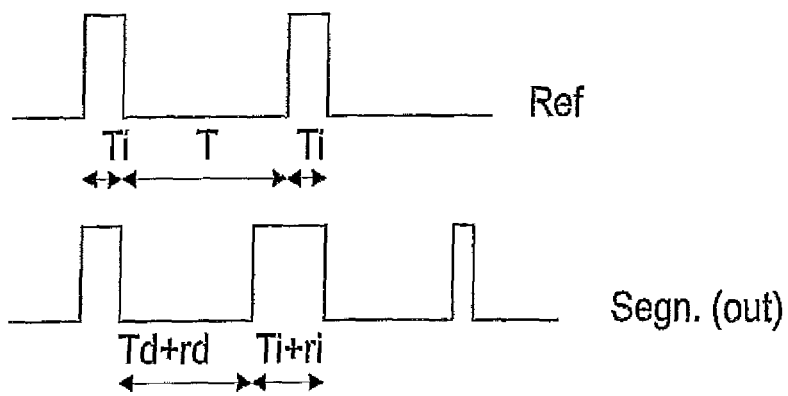
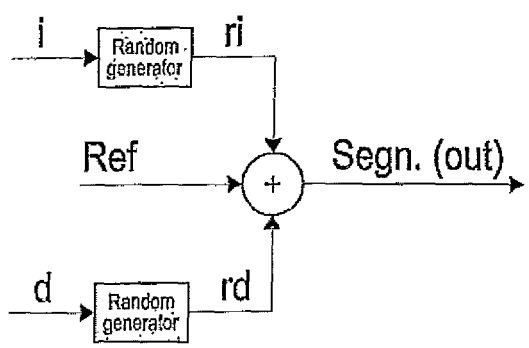
Ti = impulse length ON
Td = length delay OFF
rd = random added to Td
ri = random added to Ti
Fig. 5

OPERATING MACHINE AND RELATIVE METHOD FOR THE SURFACE TREATMENT OF CYLINDERS

FIELD OF THE INVENTION

The present invention relates to an operating machine and related method for the surface treatment of operating cylinders and, in particular, lamination cylinders.

The invention is advantageously applied, for example, in performing a surface treatment to which cylinders suitable for the production of metal laminates having certain roughness characteristics or parameters are subjected, to make them suitable for use in particular applications such as, for example, molding and painting.

The following description will therefore specifically refer to this kind of application, at the same time, however, maintaining its generality.

BACKGROUND OF THE INVENTION

The process for the lamination of metals currently comprises passing a metal sheet through a pair of rotating cylinders, which gives the sheet a certain thickness and hardness and, in some cases, for example in the cold lamination of flat products destined for the construction of cars and household appliances, a specific surface roughness as the geometrical surface characteristics are conveyed, in negative, onto the sheet treated.

The above-mentioned roughness parameters, and consequently the surface characteristics of lamination cylinders, are predetermined in relation to the end-use of the sheet obtained by passage through the same cylinders.

The above cylinders used for lamination must generally be periodically ground due to the deterioration undergone during the production process, and this grinding process is not always sufficient for giving the surface of the cylinder all the desired characteristics, sometimes requiring, for example in the applications mentioned above, a further surface treatment that allows a certain degree of roughness to be obtained and controlled. With respect to all the characteristics this roughness should have, it should be pointed out that said roughness is defined as a distribution of crests and craters. These craters must have more or less homogenous dimensions and must be as randomly distributed as possible.

The present known technique for treating the surface of these lamination cylinders uses different, more or less complex, technologies, of which the most widely used are sandblasting and electro-erosion, also known by experts in the field as EDT (Electro Discharge Texturing).

These treatment technologies allow a good regulation of the average roughness, but are characterized by process dangerousness and a high environmental impact, with a consequent considerable complexity in the management and disposal of the residues, in addition to the operating costs.

Sandblasting, for example, requires large-sized plants which use, for their functioning, massive turbines that are noisy and dangerous; furthermore, this process has a significant toxicity of the powders emitted by the abrasive sand, which must be purified and filtered by a specific system.

Finally, the nature of the process requires considerable maintenance due to the abrasive used which damages numerous components that cannot be adequately protected.

In addition to all of this, sandblasting does not allow a good control of the roughness and consequently the cylinders treated with this process produce a laminate which has a poor homogeneity on a roughness level.

Electro-erosion or EDT is a technology which currently offers the best results from a qualitative point of view, due to the homogeneity of the roughness obtained and total absence of traces of the machining step.

It should be noted, however, that the process is extremely dangerous due to the wide use of flammable products, such as dielectric liquids, and therefore requires the introduction of a sophisticated fire-protection system to prevent any possible sources of ignition.

The environmental impact of EDT is also considerable and even higher than that of sandblasting, as dielectric liquids are extremely toxic and must be frequently disposed of through special procedures which are also extremely costly.

A variant of the EDT process, even if less widely-used, is the EBT (Electron Beam Texturing) process, where the material is melted locally, so as to form a microcrater and deposited at the sides of the same crater.

A considerable drawback of the machines that effect this process is that the cylinder, during treatment, must be positioned in a chamber where there is a substantial forced vacuum degree, making the machine extremely expensive, difficult to maintain and ultimately unsuitable for lamination environments.

There are also other technologies that attempt to obtain the desired roughness by applying material to the surface of the cylinder rather than removing it as in the EDT technology, but the results obtained so far are not interesting for industrial applications.

Another treatment technology of cylinders currently available and capable of overcoming the considerable problems of those described above, consists of effecting an incision treatment of the surfaces of the cylinders with the use of continuous carbon dioxide laser beams or "$CO_2$ lasers".

The above treatment with continuous $CO_2$ laser beams is powerful (the beams can reach power values in the order of Kw) and does not have any impact from an environmental point of view, but it is not without drawbacks, such as, for example, the fact that the conveying of the light beam towards the surface of the cylinder to be treated particularly lacks flexibility and is delicate. By operating in the "medium infrared" frequency range, in fact, (where glass is opaque and consequently optical fibers do not function), the beam is induced to incise the piece to be processed by means of mirror and lens systems and this technological limitation complicates the creation of a relative movement between the cylinder to be treated and the laser beam emitter. Furthermore, the use of a continuous high-power beam having a relatively extensive section, propagating into the air, and invisible, as it operates within the infrared frequency range, makes these machines intrinsically dangerous especially for possible ocular damage. The whole system (including the optical path) must therefore be shielded to avoid dangerous uncontrolled reflections.

The conveying limitations of the $CO_2$ laser beam make it extremely difficult to produce surfaces without regularity, the incision sequences created with this technology tend to have passage lines on the lamination cylinders and these give the metal laminates a roughness quality that cannot be used in numerous applications, such as for example the painting of laminates suitable for being used as external parts of motor vehicles or household appliances.

SUMMARY OF THE INVENTION

The objective of the present invention is therefore to provide a machine which implements a process capable of solving the drawbacks of the known art described above.

In particular, an objective of the present invention is to provide an innovative machine for the surface treatment of operating cylinders that is capable of giving effective results together with a negligible environmental impact, typical of normal machine tools, and so that the use of the cylinders thus treated can enable metal laminates to be obtained, having a particularly satisfactory roughness and for high-quality applications, such as those indicated above.

A further objective is to provide a method for the surface treatment of operating cylinders which is rapid, effective and economically advantageous. In view of the above objectives, according to the present invention, a machine is provided, together with the relative method for the surface treatment of cylinders having the characteristics indicated in the enclosed claims.

BRIEF DESCRIPTION OF THE DRAWINGS

The structural and functional characteristics of the present invention and its advantages with respect to the known art will appear more evident from the following description, referring to the enclosed drawings, which show a schematization of a preferred but non-limiting embodiment of an operating machine for surface treatment in question, in which:

FIG. 5 represents a diagram which schematizes the generation process of laser pulses suitable for producing a desired roughness on the surface of a cylinder operating in the machine, object of the invention;

DETAILED DESCRIPTION OF EMBODIMENTS OF THE INVENTION

Figure 1:
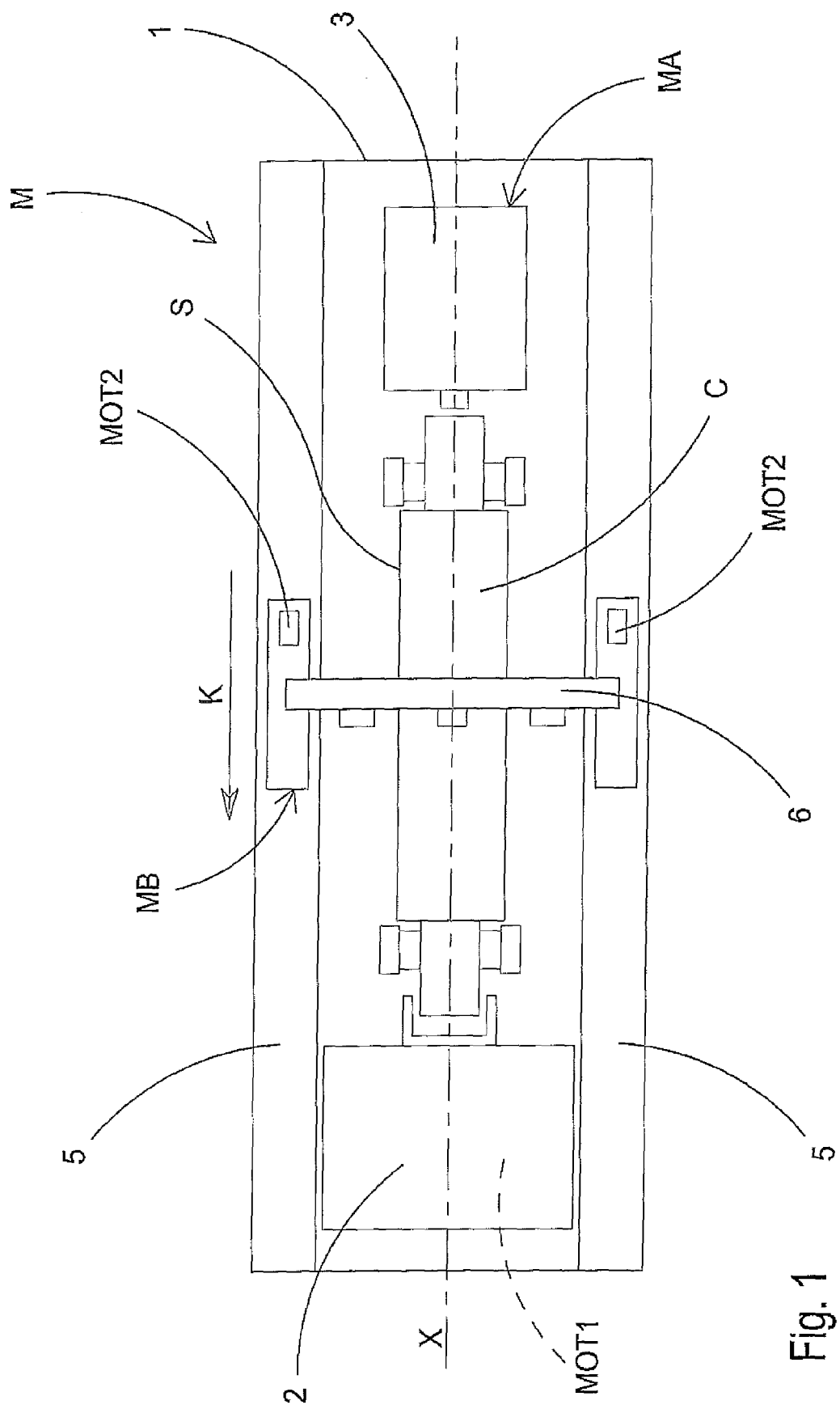
FIG. 1 is a schematic plan view of a preferred embodiment of a machine for the surface treatment of a cylinder.

With reference to FIG. 1, M indicates as a whole an operating machine, preferably automatic and possibly numerically controlled, suitable for effecting a treatment on the surface S of an operating cylinder C in order to obtain a controlled and optimum roughness on the whole peripheral surface extension S of the cylinder itself C.

In particular, a pair of cylinders C, suitably treated through the use of the machine M, is advantageously and effectively adopted for effecting the lamination of metal sheets destined for high-quality applications, such as, for example, the molding and painting of the same sheets for use in the automobile or household appliance industries.

The machine M is substantially composed of two operating stations cooperating and coupled with each other and indicated in FIG. 1 with MA and MB.

The station MA of the machine M is substantially defined by a supporting base 1 for a group 2 or piece-holder head, suitable for rotating the cylinder C around its own longitudinal axis X, under the action of a motor MOT1, and supporting a group 3 or tailstock centre which, together with the group 2 has the purpose of constraining the cylinder C in an axial direction during processing.

The supporting of the cylinder C during the process can be effected, as is normally the case in the grinding technology for rolling-mill cylinders, by means of a pair of suitable supports 4 commonly called "lunettes", each of which is equipped with at least two slides 4a radially adjustable to adapt themselves to the diameter of the portion of cylinder on which the supporting is effected; said "lunettes" 4 can be conveniently housed onboard the supporting base 1. If the cylinder C, however, has particular geometrical characteristics, it is obviously possible to also use units 2 and 3 for sustaining the cylinder C and define its rotation axis (support between the centres); in this case, the "lunettes" 4 are not used.

The station MB of the machine M slides on a pair of guides 5, conveniently positioned onboard the base 1 and comprises at least a supporting structure 6, for example, portal, movable along a first direction K parallel to the rotation axis X of the cylinder C.

Said guides 5 can be with rolls, for example, or hydrostatic or hydrodynamic (known and not illustrated), whereas the movable structure or structures 6 can be activated by one or more motors MOT2.

Figure 2:
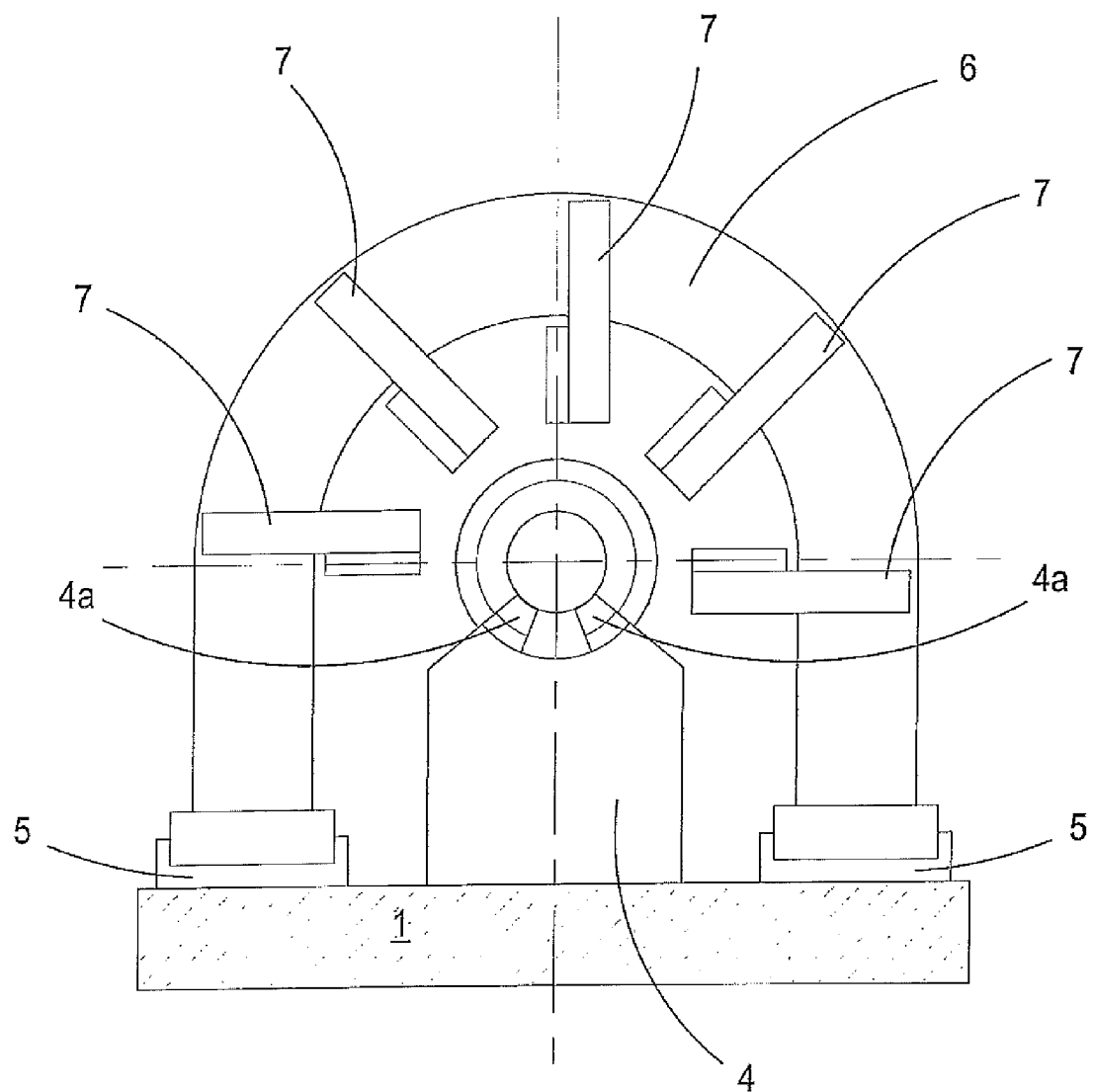
FIG. 2 is a transversal sectional view of the machine represented in FIG. 1.

The structures 6 of the station MB are suitable for supporting one or more arms 7, which have the possibility of moving in a radial direction, or second direction Z, with respect to the centre of the machine, defined by the line of the axis X in the plane where the machine M is represented in FIG. 2.

This direction is indicated by Z and is perpendicular to the axis X and direction K; this movement is created with known means and is therefore not illustrated.

The arm 7, in turn, is suitable for carrying, by means of suitable supporting and movement mechanisms that will be described hereunder, an emitter or emitting head 8 of pulsed laser beams, or trains of laser pulses, connected and forming part of a laser generator GE through an optical fiber 14.

The characteristics of these trains of laser pulses are represented in the diagram of FIG. 5 which indicates, in the abscissa, the time t, and in the ordinate, the signal state: high, or state 1, or low, or state 0.

There is generally a reference which is superimposed by a sound in terms of random variation in the duration time of states 0 and 1. The values of the sound added to the low state 0 and high state 1 are generally different.

Figure 5A:
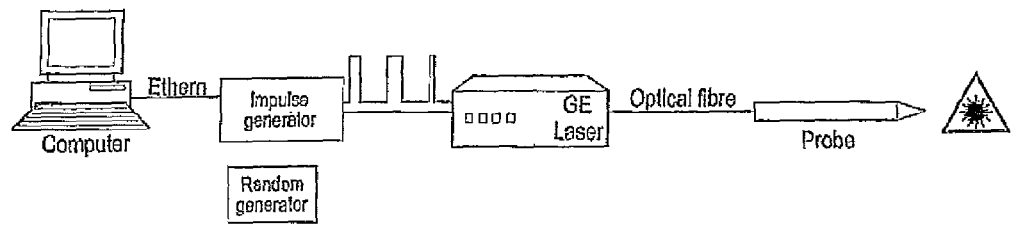
FIG. 5a is a block scheme illustrating some components relating to the control of the machine, object of the invention.

FIG. 5a shows a block scheme of the components which form the part relating to the production and control of the optical fiber laser beam.

The processing parameters, such as, for example, the characteristics of the pulse and sound curve, are established by means of a supervisor interface, installed for example on a computer of any device suitable for managing human-machine interfaces, the pulse generator then provides the Laser generator GE with the reference signal which corresponds to the presence of the laser beam at the outlet of the probe, with the characteristics established.

The Laser generator GE emits a beam whose duration and energy are bound to both the delay period (state 0) during which the system is recharged and also the pulse duration or high state 1.

Figure 5B:
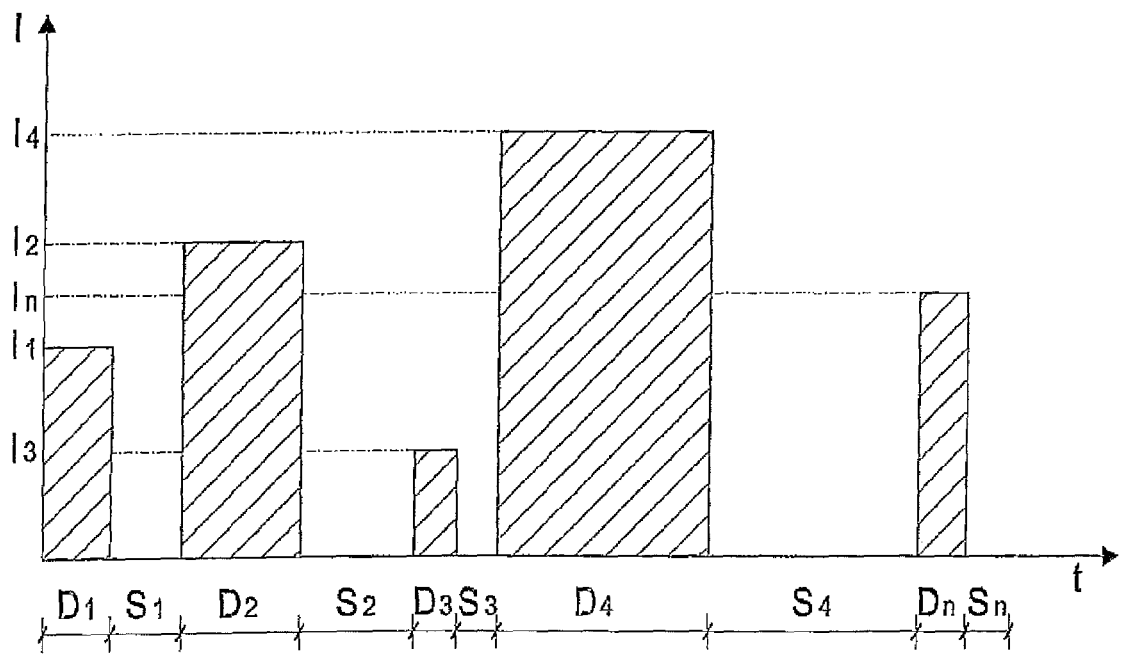
FIG. 5b is a diagram of the functional variables in play during the control of the machine, object of the invention.

FIG. 5b schematizes the characteristic of the laser that will cut the cylinder: the generator GE has the possibility of emitting a laser signal with a generic intensity In, having a duration Dn and with a silent interval Sn between one signal Dn and another Dn+1.

The diagram illustrated in FIG. 5b clearly shows that all the variables In, Dn and Sn can be varied as required by a suitable control system of the generator GE.

The other fundamental and specific feature of the head 8 indicated above is that the signal generated by GE is conveyed by means of a simple optical fibre, not bulky and mechanically flexible, and whose advantages with respect to the classical $CO_2$ technology will be clearly understood hereunder.

Figure 3:
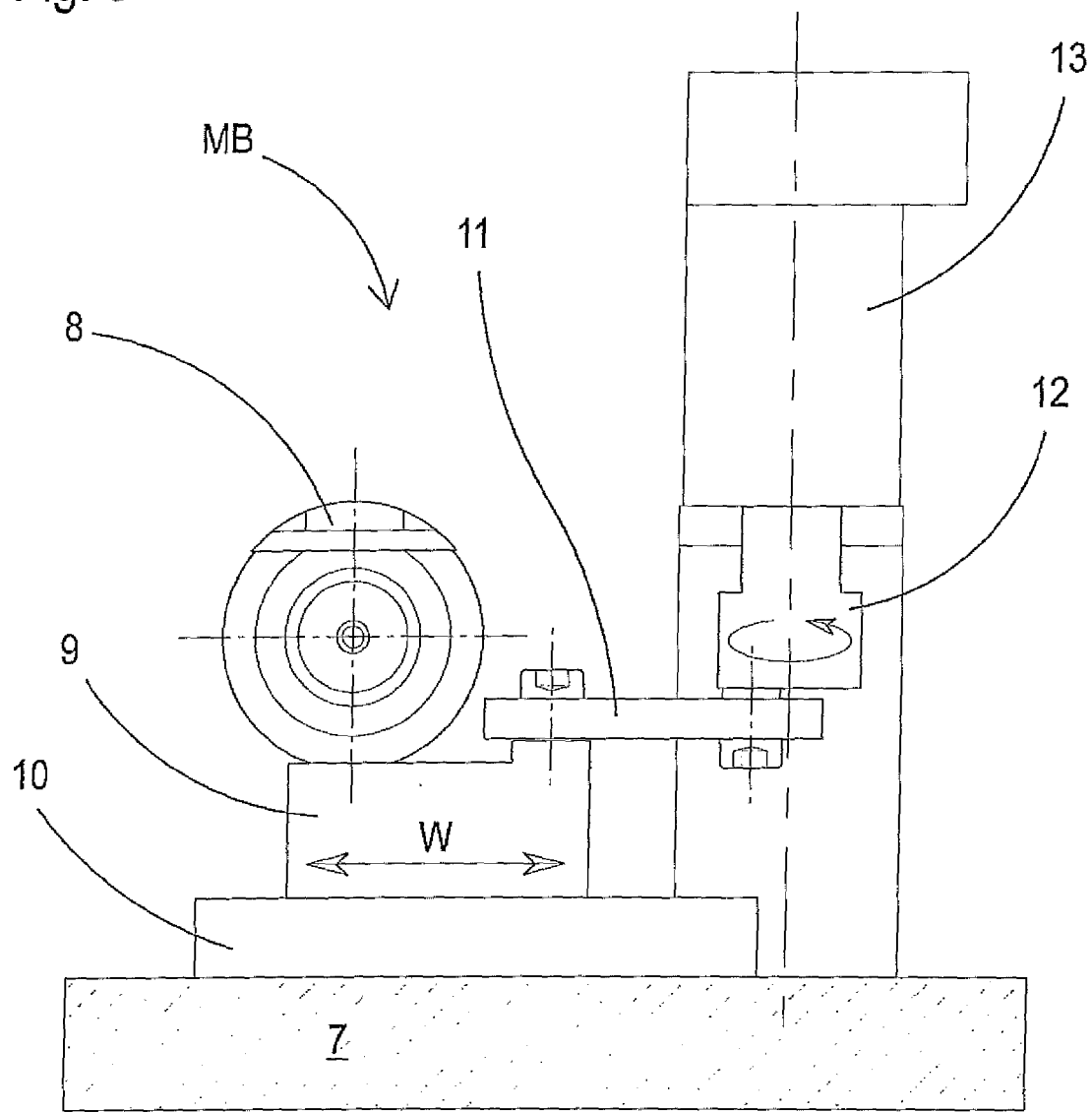
FIG. 3 is a schematic front view of an operating component of the machine illustrated in FIG. 1.
Figure 4:
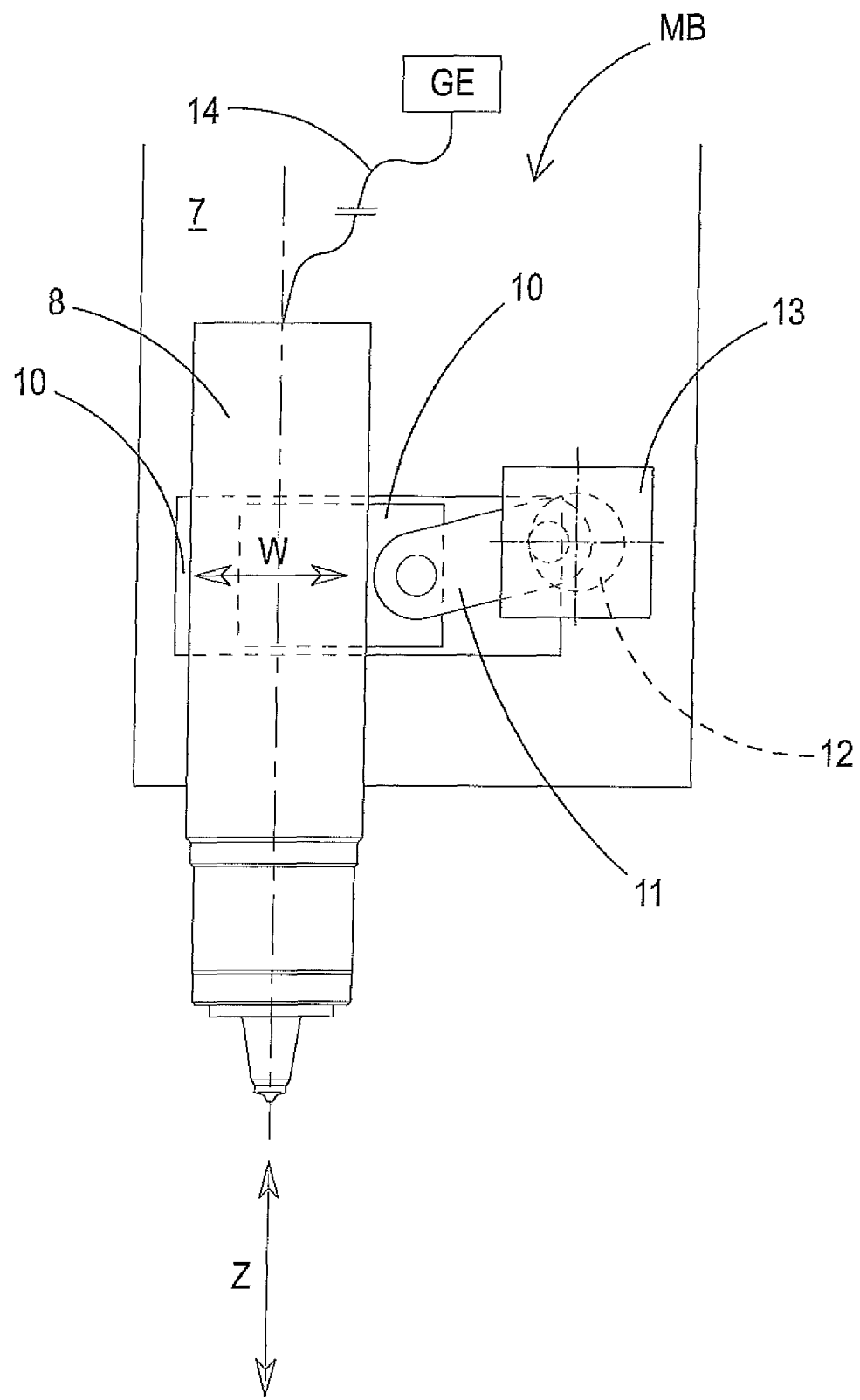
FIG. 4 is a schematic plan view, on an enlarged scale, of a detail of the component illustrated in FIG. 3.

According to what is illustrated in the example of embodiment, non restrictive, of the invention, illustrated in FIGS. 3 and 4, the head 8 is fixed to a trolley 9 which can run, by means of suitable supporting guides 10, along a third direction W, in turn parallel to the first direction K and axis X of the cylinder C previously described. The possible movement of the head 8 along the direction W can be determined, for example, by means of a common connecting rod-crank mechanism, represented in FIGS. 3 and 4 by the connecting rod 11 and crank 12, rotated by a suitable rotation generator indicated with 13.

The simple mechanism described above, when in use, allows regulation movements of the position of the head 8 alone to be generated along the direction W, parallel to the directions K and X and with a law of motion independent of that imposed on the structure or structures 6 by MOT2; furthermore, it is also possible to regulate the extent of the run along W by acting on the eccentric 12.

Figure 6:
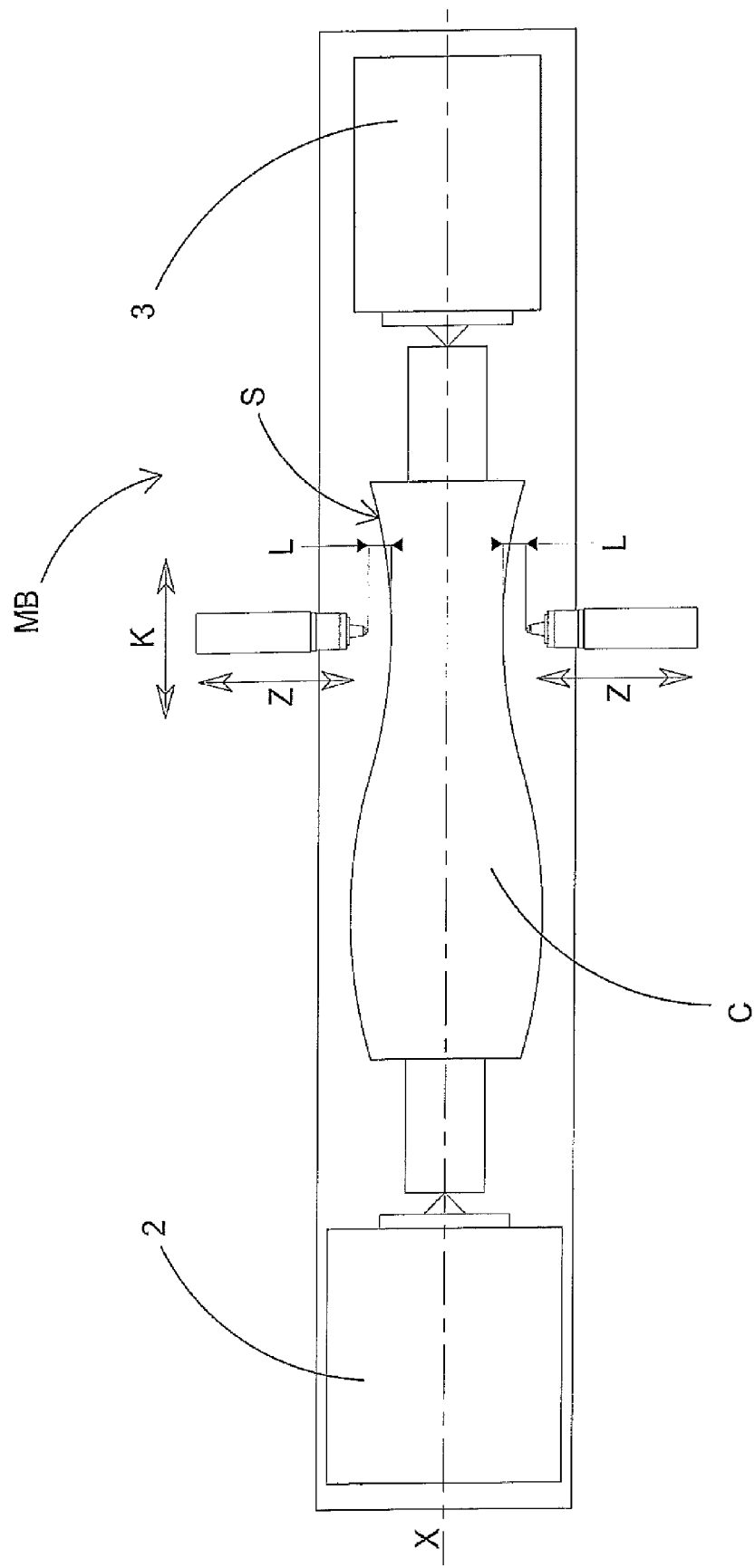
FIG. 6 shows a plan view of a treated cylinder that can be obtained with the components shown in FIGS. 1, 2, 3 and 4.

In short, the position of the head 8 with respect to the cylinder C can be moved according to two degrees of freedom, i.e.: a micrometric regulation from and towards the cylinder C in the direction Z obtained by the movement of the arm 7 with two objectives: the first is to adapt the position of the head to the diameter of the cylinder to be processed at a desired relative distance L (FIG. 6), and the second is to modify the position of the head along the direction Z to keep this relative distance L constant with a variation in the position MB along the direction K in relation to the profile of the cylinder, assuming (quite commonly) that this profile is not "flat"; cylinders especially used in the lamination of metals, in fact, have variously-shaped profiles which can be concave-curved, convex-curved, sinusoidal or, more generically, polynomial.

Furthermore, if the machine M is constructed in the variant in which the station MB is equipped with more than one laser head 8 assembled on respective arms 7, these can operate simultaneously and cover and treat different areas of the surface S of the cylinder C, with the result of making the process more rapid.

If different laws of motion are applied for the axes W of each head 8, moreover, an even more effective randomization effect can be obtained.

In this way, when in use, the machine M allows a distribution of incision holes or micro-craters to be formed on the surface S of the cylinder C that create a certain roughness on the surface S itself of the cylinder C.

At this point of the description, it should be pointed out that the application of the degrees of freedom Z and possibly W to one or more of the heads 8 would be practically impossible if the laser signal were generated with the classical $CO_2$ technology; as this signal can in fact only be "conveyed" by means of mirrors and lenses, the generator GE would have to be assembled directly onboard the trolley 9, but the masses and dimensions of these devices would make the application of the above degrees of freedom W and Z with acceptable dynamic characteristics, too difficult if not impossible.

It should be noted that in general there are three main fundamental parameters that determine the quality of a surface processing of a cylinder, or roughness of the surface of the same cylinder:

the depth of the micro-craters produced on the surface of the cylinder their size, that can be defined for example with their diameter in correspondence with the surface of the cylinder the density and distribution of the micro-craters in a predefined area of the surface of the cylinder.

With the use of the surface-treatment machine M described above and object of the present invention, the depth and size of the micro-craters are regulated by a variation in the power of the laser generator GE, (this parameter is defined by the magnitude I in the diagram of FIG. 5b) and by the variation in the distance between the emitter head 8 and surface S of the cylinder C. This distance is varied by means of the arm 7 that has the possibility of translating perpendicularly with respect to the cylinder C along the direction Z.

Once regulated, the distance between the cylinder C and emitter head 8 is kept constant for the whole processing cycle of the cylinder C.

The density of the micro-craters generated on the cylinder C is then regulated by acting on various parameters, such as the rotation rate of the cylinder C around its own axis X, the translation rate of the structure MB along the direction K, the rate and extent of the translation motion of the trolley 9 along the direction W (when carry out), and the number of laser pulses emitted by the laser head 8 in the time unit, i.e. the combination of variables Dn and Sn indicated in the diagram of FIG. 5b.

It should be pointed out that all of the above parameters can be suitably varied during an operating phase of the machine M, thus allowing a completely random distribution of the micro-craters to be obtained without there being any passage lines or repeated sequences at equal intervals which would make the final processed product unacceptable.

In particular, during the functioning cycle of the machine M, the rate of the group 3 or piece-holder head can be varied according to a cycle, for example, with a sinusoidal trend around a certain average value, whereas the structure MB translates parallelly to the axis X of the cylinder.

The trolley 9 is moved contemporaneously with the translation of the structure MB, thanks to the connecting rod-crank mechanism defined by the elements 11, 12 and 13, thus creating a further "randomization" source of the erosion process of the surface of the cylinder C; this source can be additionally enriched by imposing a non-constant law of motion on the movement generator 13.

It is therefore advantageously possible to vary both the roughness (Ra) of the surface S of the cylinder C and the number of peaks incised on the surface S itself The number of pulses generated by the laser generator GE can also be advantageously varied by setting the operating parameters randomly through the display interface (Computer), as schematized in FIGS. 5 and 5a.

At this point, another considerable advantage of the present invention with respect to the known $CO_2$ laser technology is clearly evident; in this case, in fact, the laser signal is emitted by the $CO_2$ source with a constant intensity I and therefore without any alternation of peaks Dn and silences Sn; consequently, the only way for obtaining a kind of incision randomness of the laser on the surface S of the cylinder C is to interpose, between the $CO_2$ laser emitter and the surface S, a system capable of allowing the passage of the beam or obstructing it, with a frequency in the order of KHz.

This could be achieved, for example, with a disc positioned between the source and surface S to be processed, carrying a series of square teeth on its border and the laser beam that passes exactly in correspondence with this area.

Once rotating, this disc generates the series of peaks Dn and silences Sn described above; the variability, however, is limited to the number of teeth that can be applied on said disc, i e. it is limited to the diameter of the disc itself which, for practical reasons of encumbrance cannot be too large; it is evident that, once the disc has ended a rotation, the series of teeth is repeated, thus creating a periodicity that inevitably jeopardizes the "randomization" principle. One of the ways for overcoming this limitation could be to impose a variable rotational motion on the disc, however, ultimately, the state of the art envisages three randomization variables (angular rate of the cylinder, angular rate of the disc and relative head-cylinder distance) against the eight variables of the present invention, i.e. rotation of the cylinder around the axis Z, law of motion of the structure or structures 6 along K, trajectory in the direction W, law of motion of the eccentric 12, position of the head along Z, intensity of the laser pulse I and duration of the pulses Dn and silences Sn.

The functioning cycle of the machine M for the surface treatment of a cylinder C is effected according to the following operative phases:

The cylinder C is positioned on the station MA.

After setting the above-mentioned processing parameters in the specific interface, the machine M is started and the cylinder C begins to rotate around the axis X.

Each emitter head 8 is positioned thanks to a suitable drive on the arm 7 (known and not shown) close to the cylinder C at a prefixed close distance L and the drive 11, 12, 13 induces the head 8 to oscillate in the direction W with a pre-established run. At this point, the head 8 begins to emit trains of laser pulses that progressively strike points arranged on a strip along the circumference of the surface S of the cylinder C. In this way, with the rotation of the cylinder, together with the translation of the portal or portals 6, this strip forms a helix which progressively extends over the whole surface of the cylinder C being processed; a distribution of micro-craters is thus generated on the whole surface S, that defines the final roughness of the cylinder C. The randomness with which these craters are generated depends, according to the disclosure of the present invention, on the parameters described above and it is evident that, with such a high number of parameters that can be actively regulated during the process, a completely random distribution of craters can be obtained, as required by processes using the cylinders C, in particular cylinders for the lamination of metals.

Once the surface treatment has been completed, each head S is moved away from the cylinder C under the thrust of its drive, and the machine M is automatically set up for the removal of the treated cylinder C.

The invention claimed is:

1. A machine for surface treatment of a laminating cylinder comprising:
    a first operative station for supporting said laminating cylinder and bringing said laminating cylinder into rotation around a longitudinal axis thereof (X), and
    at least a second operative station cooperating with said first operative station for generating and emitting, through an optical fiber apparatus, pulsed laser radiations randomly striking a surface of said laminating cylinder and defining a desired roughness on the surface of said laminating cylinder,
    said second operative station being adjustably coupled with said first operative station in a first direction parallel with respect to the longitudinal axis of said laminating cylinder and carrying one or more pulsed laser radiation emitting heads, said second operative station being slidingly assembled with respect to said laminating cylinder in a second direction perpendicular to said longitudinal axis,
    wherein said laser radiations pulsed by said optical fiber apparatus, emitted by said one or more emitting heads, are configured for creating a distribution of incisions or craters on said surface which define said desired roughness,
    further comprising an optical fiber for transporting said pulsed laser radiations.

2. The machine according to claim 1, wherein said one or more emitting heads are movable in a third direction parallel to said first direction and to said cylinder.

3. The machine according to claim 2, wherein said second operative station comprises,
    said one or more emitting heads (8) which emit trains of laser impulses,
    a supporting and regulation device of a position of said one or more emitting heads with respect to said surface of said laminating cylinder in said second and third directions, and
    a movement device of said supporting and regulation device of said one or more emitting heads in said first direction parallel to said longitudinal axis of said laminating cylinder.

4. The machine according to claim 3, wherein said supporting and regulation device comprises at least one arm suitable for supporting said one or more emitting heads, said supporting and regulation device comprising a trolley support configured to be moved on a guide to allow movements of the position of said one or more emitting heads with respect to the arm along the third direction, under a thrust of a motor connected to said trolley support by a connecting rod.

5. The machine according to claim 3, wherein said movement device comprises at least a structure sliding on guides applied to a base of said first operative station (MA) under a thrust of a motor.

6. The machine according to claim 4, wherein said arm is configured to continuously regulate the position of said one or more emitting heads along said third direction using a specific command.

7. A method for surface treatment of a laminating cylinder rotating said laminating cylinder around a longitudinal axis thereof;
    striking a surface of said laminating cylinder with trains of impulses emitted by laser emitting heads, thereby generating a distribution of incisions or craters on the surface; and
    controlling said distribution of incisions or craters through regulation and movement of said emitting heads with respect to said laminating cylinder to define a predetermined roughness on said surface,
    wherein said regulation of the emitting heads is performed by regulating a position of the emitting heads with respect to said surface of said laminating cylinder in a second direction transversal to said longitudinal axis, and
    wherein said movement of said emitting heads is performed by sliding the emitting heads in a first direction parallel to said longitudinal axis of said laminating cylinder.

8. The method according to claim 7, wherein said emitting heads are adjustable between each other in a third direction perpendicular to the second direction.

* * * * *